US012795708B2

(12) United States Patent
Maamari et al.

(10) Patent No.: US 12,795,708 B2
(45) Date of Patent: Nov. 10, 2026

(54) RESOLVING BASEBAND PROCESSING AND UPLINK RESOURCE COLLISIONS FOR ENERGY EFFICIENT SCHEDULING

(71) Applicant: QUALCOMM Incorporated, San Diego, CA (US)

(72) Inventors: Diana Maamari, San Diego, CA (US); Gabi Sarkis, San Diego, CA (US); Sibasish Das, San Diego, CA (US); Mickael Mondet, Louannec (FR)

(73) Assignee: Qualcomm Incorporated, San Diego, CA (US)

( * ) Notice: Subject to any disclaimer, the term of this patent is extended or adjusted under 35 U.S.C. 154(b) by 267 days.

(21) Appl. No.: 18/792,254

(22) Filed: Aug. 1, 2024

(65) Prior Publication Data

US 2026/0040340 A1 Feb. 5, 2026

(51) Int. Cl.

*H04W 72/04* (2023.01)
*H04W 72/1273* (2023.01)
*H04W 72/52* (2023.01)
*H04W 72/566* (2023.01)

(52) U.S. Cl.

CPC ....... *H04W 72/52* (2023.01); *H04W 72/1273* (2013.01); *H04W 72/566* (2023.01)

(58) Field of Classification Search

CPC ......... H04W 52/0216; H04W 52/0229; H04W 52/0209; H04W 52/0232; H04W 52/0238; H04W 52/0235; H04W 52/0274; H04W 76/28; H04W 72/04

See application file for complete search history.

(56) References Cited

U.S. PATENT DOCUMENTS

| | | | | |
|---|---|---|---|---|
| 12,069,633 B2 * | 8/2024 | Lei | H04L 5/0053 | |
| 2023/0155798 A1 * | 5/2023 | Abotabl | H04L 5/0092 | 370/329 |
| 2023/0209519 A1 * | 6/2023 | Li | H04W 72/56 | 370/329 |
| 2024/0121070 A1 * | 4/2024 | Abdelghaffar | H04W 48/12 | |

* cited by examiner

*Primary Examiner* — Bo Hui A Zhu
(74) *Attorney, Agent, or Firm* — HOLLAND & HART LLP

(57) ABSTRACT

Methods, systems, and devices for wireless communications are described. The described techniques may enable a user equipment (UE) prevent a baseband processing duration associated with an energy efficient scheduling mode of one or more wideband communication resources from overlapping with one or more uplink slots reserved for uplink communications. For example, the UE may refrain from entering the energy efficient scheduling mode for a configured duration or until the UE transmits one or more uplink messages in the one or more uplink slots. In some examples, the UE may determine whether to enter the energy efficient scheduling mode based on a priority associated with the uplink messages or based on a capability of the UE to perform uplink and downlink communications in different power states.

20 Claims, 10 Drawing Sheets

RESOLVING BASEBAND PROCESSING AND UPLINK RESOURCE COLLISIONS FOR ENERGY EFFICIENT SCHEDULING

FIELD OF TECHNOLOGY

The following relates to wireless communications, including resolving baseband processing and uplink resource collisions for energy efficient scheduling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a user equipment (UE) is described. The method may include receiving first configuration information for downlink scheduling, the first configuration information associated with a first threshold throughput, receiving second configuration information for downlink scheduling, the second configuration information associated with a second threshold throughput, where the second threshold throughput is less than the first threshold throughput, and operating according to one of the first configuration information or the second configuration information based on satisfaction of one or more criteria and on a collision between a processing duration associated with the second threshold throughput and one or more uplink time resources.

A UE for wireless communications is described. The UE may include one or more memories storing processor executable code, and one or more processors coupled with the one or more memories. The one or more processors may individually or collectively be operable to execute the code to cause the UE to receive first configuration information for downlink scheduling, the first configuration information associated with a first threshold throughput, receive second configuration information for downlink scheduling, the second configuration information associated with a second threshold throughput, where the second threshold throughput is less than the first threshold throughput, and operate according to one of the first configuration information or the second configuration information based on satisfaction of one or more criteria and on a collision between a processing duration associated with the second threshold throughput and one or more uplink time resources.

Another UE for wireless communications is described. The UE may include means for receiving first configuration information for downlink scheduling, the first configuration information associated with a first threshold throughput, means for receiving second configuration information for downlink scheduling, the second configuration information associated with a second threshold throughput, where the second threshold throughput is less than the first threshold throughput, and means for operating according to one of the first configuration information or the second configuration information based on satisfaction of one or more criteria and on a collision between a processing duration associated with the second threshold throughput and one or more uplink time resources.

A non-transitory computer-readable medium storing code for wireless communications is described. The code may include instructions executable by one or more processors to receive first configuration information for downlink scheduling, the first configuration information associated with a first threshold throughput, receive second configuration information for downlink scheduling, the second configuration information associated with a second threshold throughput, where the second threshold throughput is less than the first threshold throughput, and operate according to one of the first configuration information or the second configuration information based on satisfaction of one or more criteria and on a collision between a processing duration associated with the second threshold throughput and one or more uplink time resources.

In some examples of the method, UEs, and non-transitory computer-readable medium described herein, operating according to one of the first configuration information or the second configuration information may include operations, features, means, or instructions for operating according to the first configuration information for a first time period and operating according to the second configuration information for a second time period, where the second time period occurs after the first time period.

In some examples of the method, UEs, and non-transitory computer-readable medium described herein, receiving the second configuration information may include operations, features, means, or instructions for receiving an indication of a duration of the first time period, where the one or more criteria include an expiration of the first time period.

In some examples of the method, UEs, and non-transitory computer-readable medium described herein, the second time period begins at a time following the one or more uplink time resources and the one or more criteria include an expiration of the one or more uplink time resources.

Some examples of the method, UEs, and non-transitory computer-readable medium described herein may further include operations, features, means, or instructions for transmitting a capability message indicating a capability of the UE to transmit one or more uplink messages while performing processing of one or more downlink messages according to the second threshold throughput, where operating according to one of the first configuration information or the second configuration information includes and operating according to the second configuration information, where the one or more criteria include the capability.

Some examples of the method, UEs, and non-transitory computer-readable medium described herein may further include operations, features, means, or instructions for transmitting a scheduling request message indicating that the UE will transmit via the one or more uplink time resources, where operating according to one of the first configuration information or the second configuration information includes and operating according the first configuration information based on transmitting the scheduling request message, where the one or more criteria include transmission of the scheduling request message.

In some examples of the method, UEs, and non-transitory computer-readable medium described herein, operating according to one of the first configuration information or the second configuration information may include operations, features, means, or instructions for operating according to the first configuration information based on a first priority of one or more uplink messages being higher than a second priority associated with operating according to the second configuration information, where the one or more criteria include relative values of the first priority and the second priority.

In some examples of the method, UEs, and non-transitory computer-readable medium described herein, operating according to one of the first configuration information or the second configuration information may include operations, features, means, or instructions for operating according to the second configuration information based on a first priority of one or more uplink messages being lower than a second priority associated with operating according to the second configuration information, where the one or more criteria include relative values of the first priority and the second priority.

In some examples of the method, UEs, and non-transitory computer-readable medium described herein, the second configuration information indicates for the UE to refrain from monitoring for one or more downlink messages during the processing duration based on operating according to the second configuration information.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

In some wireless communication systems, a user equipment (UE) may be configured with multiple bandwidth parts (BWPs) over which the UE may communicate (e.g., with a network entity). For example, the UE may communicate with a network entity via a narrowband BWP using relatively less baseband processing (e.g., in a lower power mode) or via a wideband BWP using relatively more processing (e.g., in a high-power mode). In some examples, to reduce power consumption at the UE, the network entity may indicate for the UE to operate in the wideband BWP without increasing a power state of baseband processing of the UE (e.g., in an energy efficient scheduling mode). However, if the UE operates in the wideband BWP using a lower baseband power state, a baseband processing duration associated with receiving a downlink message in a first downlink slot in the wideband BWP may "spill over" into one or more subsequent slots. For instance, if the baseband processing duration overlaps with a slot configured for uplink, the UE may not be capable of performing both baseband processing and uplink communication in the slot.

Accordingly, techniques described herein may enable the UE to prevent the baseband processing duration associated with the energy efficient scheduling mode from overlapping with one or more uplink slots. For example, the UE may refrain from entering the energy efficient scheduling mode for a duration (e.g., after an application delay, at an indicated time, or after communicating uplink messages via the one or more uplink slots). In some examples, the UE may determine whether to enter the energy efficient scheduling mode based on a priority associated with the uplink messages or based on a capability of the UE to perform uplink and downlink communications in different power states.

Aspects of the disclosure are initially described in the context of wireless communications systems. Aspects of the disclosure are further illustrated by and described with reference to resource diagrams, process flows, apparatus diagrams, system diagrams, and flowcharts that relate to resolving baseband processing and uplink resource collisions for energy efficient scheduling.

Figure 1:
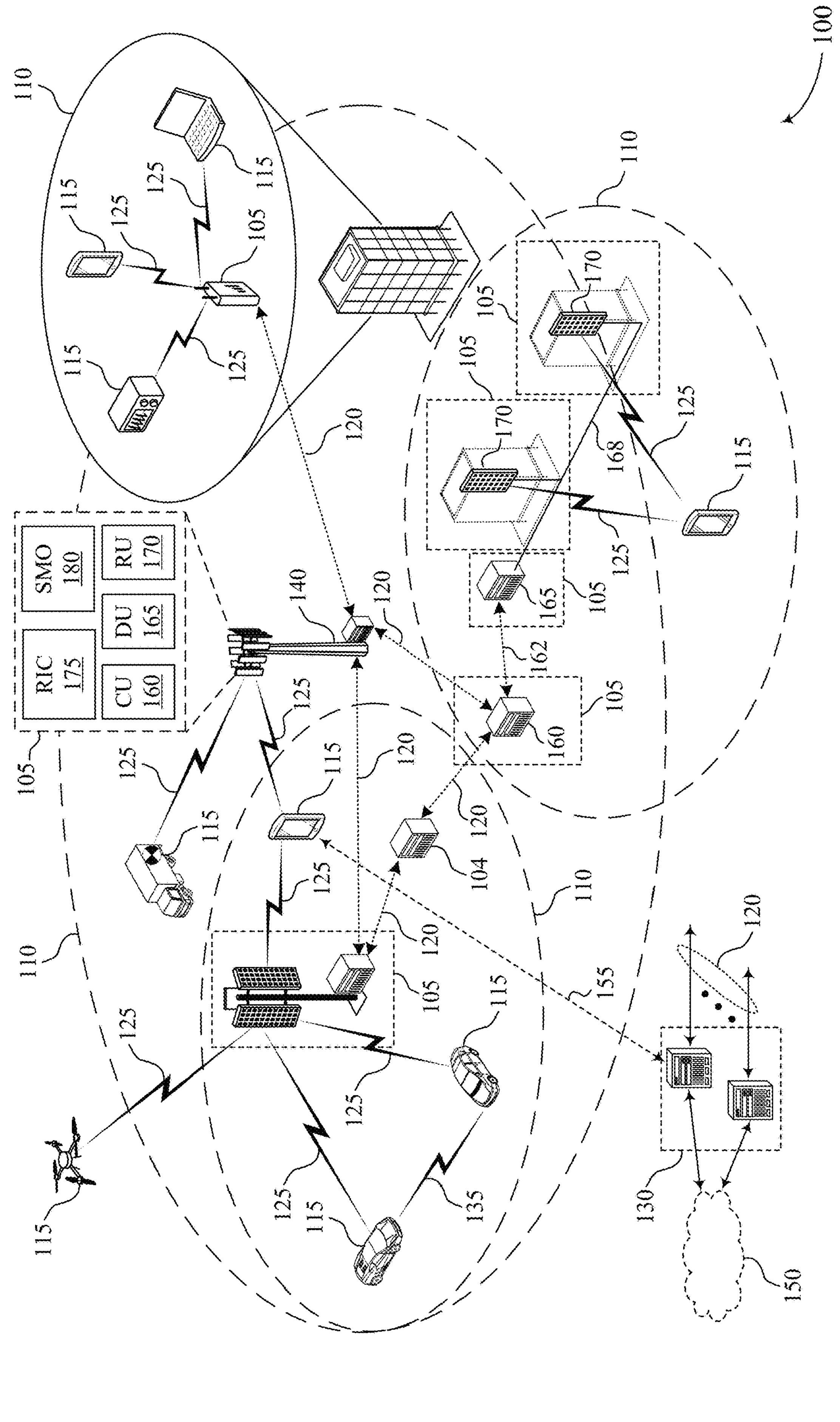
FIG. 1 shows an example of a wireless communications system that supports resolving baseband processing and uplink resource collisions for energy efficient scheduling in accordance with one or more aspects of the present disclosure.

FIG. 1 shows an example of a wireless communications system 100 that supports resolving baseband processing and uplink resource collisions for energy efficient scheduling in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (such as a communication link 125, a D2D communication link 135). HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some implementations, a device may support same-slot HARQ feedback, for which the device may provide HARQ feedback in a specific slot for data received via a previous symbol in the slot. In some other examples, the device may provide HARQ feedback in a subsequent slot, or according to some other time interval.

A UE 115 may be configured with a set of narrowband resources and a set of wideband resources. In some examples, if the UE 115 performs baseband processing in the wideband resources according to an energy efficient scheduling mode, a baseband processing duration associated with the energy efficient scheduling mode may overlap with one or more slots reserved for uplink communications. The UE 115 may therefore refrain from entering the energy efficient scheduling mode for a duration (e.g., after an application delay, at an indicated time, or after communicating uplink messages via the one or more uplink slots). In some examples, the UE 115 may determine whether to enter the energy efficient scheduling mode based on a priority associated with the uplink messages or based on a capability of the UE 115 to perform uplink and downlink communications in different power states.

Figure 2:
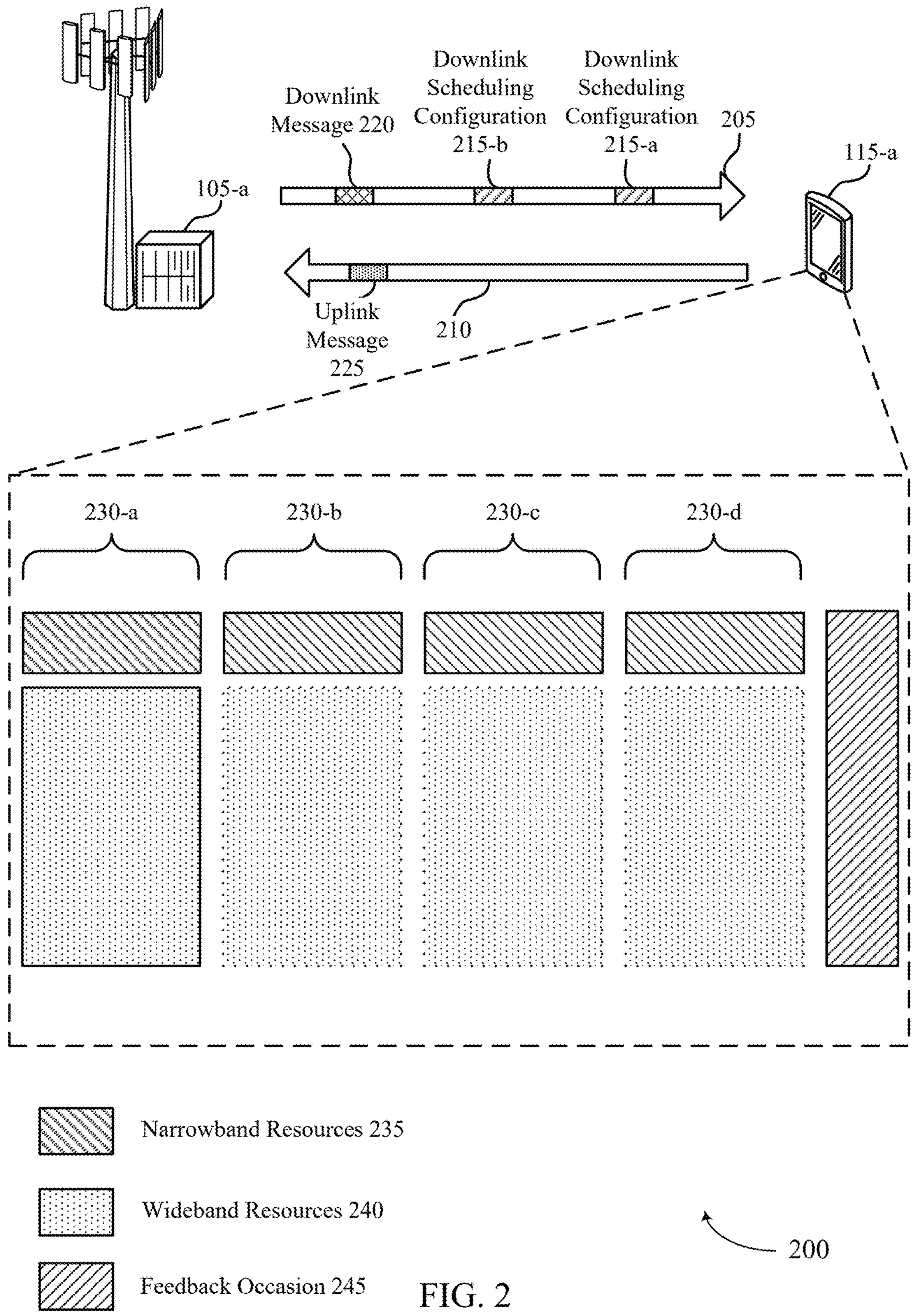
FIG. 2 shows an example of a wireless communications system that supports resolving baseband processing and uplink resource collisions for energy efficient scheduling in accordance with one or more aspects of the present disclosure.

FIG. 2 shows an example of a wireless communications system 200 that supports resolving baseband processing and uplink resource collisions for energy efficient scheduling in accordance with one or more aspects of the present disclosure. The wireless communications system 200 may implement or may be implemented by aspects of the wireless communications system 100. For example, the wireless communications system 200 may be implemented by a UE 115 (e.g., a UE 115-*a*) or a network entity 105 (e.g., a network entity 105-*a*), which may be examples of the corresponding devices as described with reference to FIG. 1.

In some examples of the wireless communications system 200, a UE 115-*a* may communicate with a network entity 105-*a* via one or more time and frequency resources, such as BWPs. For example, the UE 115-*a* may transmit uplink messages 225 (e.g., via an uplink channel 210) and receive downlink messages 220 (e.g., via a downlink channel 205) via narrowband resources 235 or wideband resources 240 and via one or more slots 230 (e.g., a slot 230-*a*, a slot 230-*b*, a slot 230-*c*, a slot 230-*d*). The narrowband resources 235 and the wideband resources 240 may include one or more respective BWPs. In some examples, the network entity 105-*a* may configure the UE 115-*a* with sets of parameters relating to downlink reception and uplink transmission, and may switch between the sets of parameters (e.g., without RRC reconfiguration). In some examples, the sets of parameters may include a bandwidth for scheduling, a rank of communications, a modulation order (e.g., a modulation and coding scheme (MCS) table used for communications), or other aspects of communications.

In some examples, the network entity 105-*a* may operate (e.g., transmit or receive messages) in the wideband resources 240 using a relatively higher rank of communications or with a relatively higher MCS to reduce transmission time and network energy consumption. Such techniques may enable the network entity 105-*a* to communicate with relatively more UEs 115 or to serve relatively higher throughput data to the UE 115-*a*. The network entity 105-*a* may therefore transmit a downlink scheduling configuration 215-*a* indicating for the UE 115-*a* to communicate with the network entity 105-*a* via the wideband resources 240 using a relatively higher throughput than a first throughput associated with the narrowband resources 235 (e.g., according to a normal scheduling mode).

In some examples, the UE 115-*a* may enter a high power mode to transmit and receive at a peak transmission rate (e.g., based on a relatively higher throughput and a relatively smaller scheduling offset and feedback timeline than a throughput, scheduling offset, and feedback timeline associated with the narrowband resources 235). That is, a first throughput associated with the narrowband resources 235 may be limited by an available bandwidth of the narrowband resources 235, and may therefore be lower than a second throughput and associated with the wideband resources 240. The UE 115-*a* may therefore use a relatively higher clock frequency and supply voltage (e.g., to support the relatively higher clock frequency), which may result in an increase (e.g., a super-linear increase) in power consumption at the UE 115-*a*.

For example, the UE 115-*a* may receive an amount of data via the narrowband resources 235 that is relatively less than an amount of data received via the wideband resources 240. The UE 115-*a* may process the data received via the narrowband resources 235 (e.g., in the slot 230-*d*) using a first throughput and transmit feedback for the data in a feedback occasion 245. However, the UE 115-*a* may not process data received via the wideband resources 240 in the slot 230-*d* using the first throughput and transmit feedback via the feedback occasion 245 due to a relatively longer processing timeline associated with processing the data received via the wideband resources 240 using the first throughput. The UE 115-*a* may therefore use a second throughput with a relatively shorter processing timeline when communicating via the wideband resources 240, which may cause the UE 115-*a* to enter the high power mode.

However, in some examples, the network entity 105-*a* may transmit a downlink message 220 to the UE 115-*a* via the slot 230-*a* and may not transmit downlink messages 220 to the UE 115-*a* via the slot 230-*b*, the slot 230-*c*, or the slot 230-*d*. In such examples, the UE 115-*a* may process the downlink message 220 using the first throughput and transmit feedback via the feedback occasion 245. The UE 115-*a* may not be aware that the network entity 105-*a* may not transmit downlink messages 220 to the UE 115-*a* via the slot 230-*b*, the slot 230-*c*, or the slot 230-*d*, and may therefore enter the high power mode to operate at a relatively higher throughput and a relatively shorter feedback timeline (e.g., a peak throughput associated with a minimum feedback timeline), which may increase power consumption of the UE 115-*a*.

Accordingly, the network entity 105-*a* may transmit a downlink scheduling configuration 215-*b* to the UE 115-*a* that indicates for the UE 115-*a* to monitor for downlink messages 220 in resources associated with the high power mode without entering the high power mode (e.g., in accordance with an efficient scheduling mode). For example, if the network entity 105-*a* enters an operation mode associated with the high power mode (e.g., using a wider bandwidth such as the wideband resources 240, using a higher rank, using a multiple activated cells, or using a higher MCS) for a reason other than sustained high-throughput operation for the UE 115-*a*, the network entity 105-*a* may indicate for the UE 115-*a* to use a throughput that is less than a peak throughput of the UE 115-*a* (e.g., the first throughput), or using a data processing or feedback timeline that is relatively longer than the processing timeline associated with the high power mode.

In some examples, the downlink scheduling configuration 215-*b* may be a physical downlink control channel (PDCCH) skipping occasion (e.g., in addition to indicating that the UE 115-*a* may use a relatively lower throughput and longer processing duration). For example, the downlink scheduling configuration 215-*b* may indicate for the UE 115-*a* to refrain from monitoring for PDCCH messages in subsequent downlink slots (e.g., the slot 230-*b*, the slot 230-*c*, and the slot 230-*d*). The UE 115-*a* may instead perform baseband processing of a physical downlink shared channel (PDSCH) message received via the slot 230-*a* (e.g., the downlink message 220) during the slot 230-*b*, the slot 230-*c*, and the slot 230-*d*.

The UE 115-*a* may therefore refrain from receiving downlink messages 220 via the slot 230-*b*, the slot 230-*c*, or the slot 230-*d*, and may instead perform processing of the downlink message 220 received via the slot 230-*a* during the slot 230-*b*, the slot 230-*c*, and the slot 230-*d*. Thus, a feedback deadline (e.g., the feedback occasion 245) for the downlink message 220 received via the slot 230-*a* via the wideband resources 240 may be the same as a feedback deadline for a downlink message 220 received via the slot 230-*d* via the narrowband resources 235.

In such examples, the UE 115-*a* may reduce (e.g., relax) a rate of baseband processing performed by the UE 115-*a*, but may use relatively higher RF power states than a power state associated with the narrowband resources 235. For example, the UE 115-*a* may be scheduled with an RF of 400 MHZ, but may operate a clock at a baseband of 100 MHz, which may result in relatively less power consumption than operating at the RF of 400 MHz with a baseband of 400 MHZ.

In some examples, however, the slot 230-*b*, the slot 230-*c*, or the slot 230-*d* may be an uplink slot reserved for the UE 115-*a* to transmit an uplink message 225. For example, as illustrated with reference to FIG. 3, a processing duration (e.g., a relaxed baseband PDSCH processing timeline) may overlap (e.g., collide) with the uplink slot. Accordingly, the UE 115-*a* may determine whether to process the downlink message 220 according to the downlink scheduling configuration 215-*a* (e.g., with a relatively higher throughput and a relatively shorter processing duration) or according to the downlink scheduling configuration 215-*b* (e.g., with a relatively lower throughput and a relatively longer processing duration) based on determining that there is a collision between the relatively longer processing duration and the uplink slot.

In some examples, the UE 115-*a* may determine whether to process the downlink message 220 according to the downlink scheduling configuration 215-*a* based on satisfaction of one or more criteria. For example, the UE 115-*a* may process the downlink message 220 according to the downlink scheduling configuration 215-*a* for a duration (e.g., a duration indicated by the downlink scheduling configuration 215-*b* or a duration that expires following the uplink slots), if the UE 115-*a* transmits a scheduling request to transmit via the uplink slots, or according to one or more prioritization rules. Additionally, or alternatively, the UE 115-*a* may process the downlink message 220 according to the downlink scheduling configuration 215-*b* if the UE 115-*a* is capable of simultaneously transmitting an uplink message 225 while processing the downlink message 220 according to the downlink scheduling configuration 215-*b*. Such techniques are described in further detail with reference to FIG. 3.

Figure 3:
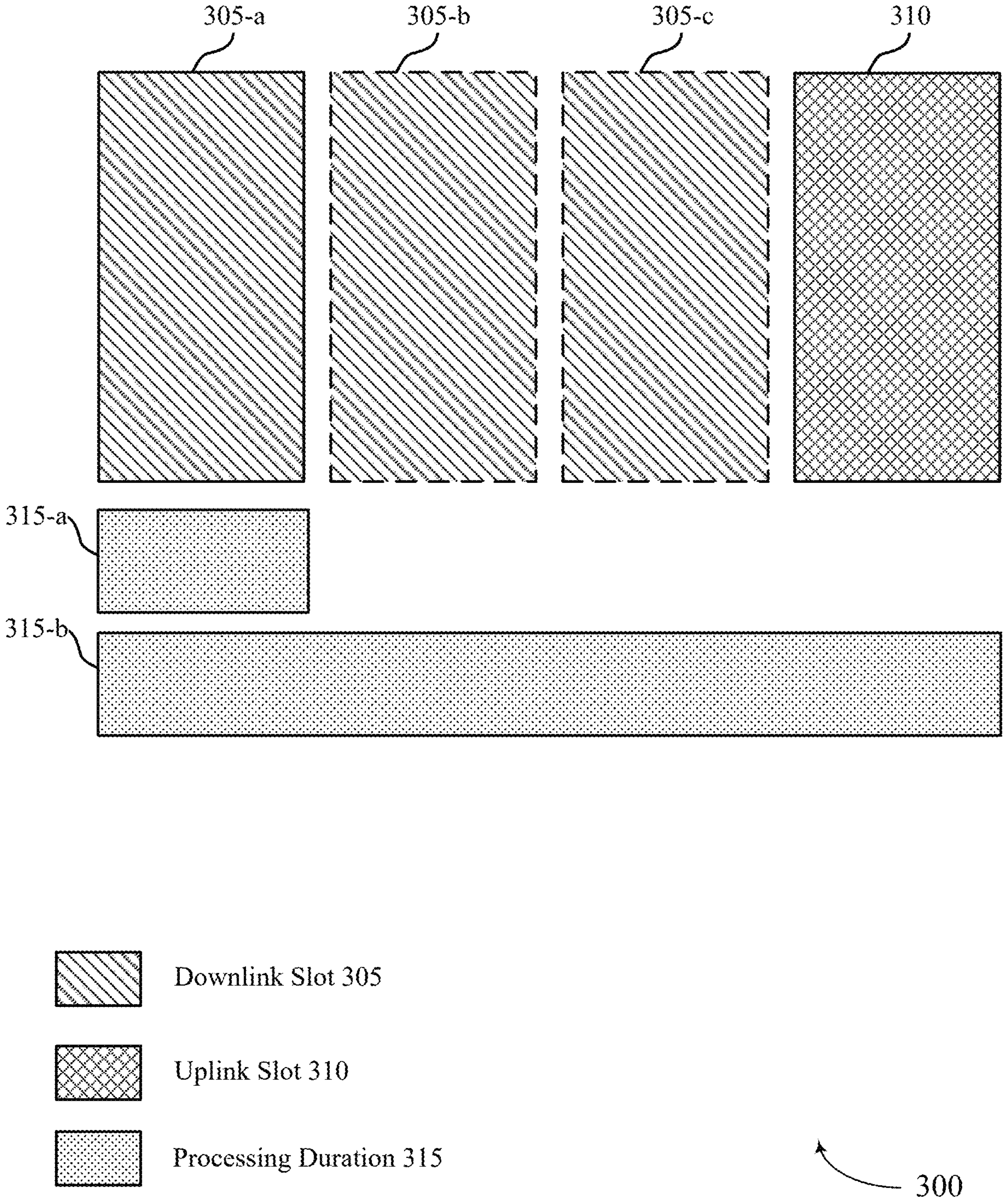
FIG. 3 shows an example of a resource diagram that supports resolving baseband processing and uplink resource collisions for energy efficient scheduling in accordance with one or more aspects of the present disclosure.

FIG. 3 shows an example of a resource diagram 300 that supports resolving baseband processing and uplink resource collisions for energy efficient scheduling in accordance with one or more aspects of the present disclosure. The resource diagram 300 may implement or may be implemented by aspects of the wireless communications system 100 or the wireless communications system 200. For example, the resource diagram 300 may be implemented by a UE 115 or a network entity 105, which may be examples of the corresponding devices as described with reference to FIG. 1.

In some examples, as described with reference to FIG. 2, a UE 115 may be indicated (e.g., by a network entity 105) to communicate via wideband resources. The UE 115-*a* may accordingly enter a high power state associated with a processing duration 315-*a* (e.g., in accordance with a normal scheduling mode) and a relatively high threshold throughput to process a downlink message received via a downlink slot 305-*a*. In some examples, the network entity 105 may indicate for the UE 115 to enter an efficient scheduling mode associated with a processing duration 315-*b* (e.g., in accordance with an energy efficient scheduling mode with a baseband of the UE 115 in a relatively more energy efficient state) and a relatively lower threshold throughput to process the downlink message received via the downlink slot 305-*a*.

In such examples, the processing duration 315-*b* may "spill" or continue into one or more subsequent slots following the downlink slot 305-*a* (e.g., a downlink slot 305-*b*, a downlink slot 305-*c*, an uplink slot 310). The UE 115 may not have a capability to adjust a baseband power state for downlink independently from a baseband power state for uplink. Accordingly, the UE 115 may handle either downlink processing or uplink transmission (e.g., rather than handling both of downlink processing and uplink transmission). Accordingly, if a collision exists between the processing duration 315-*b* and the uplink slot 310, the UE 115 may determine whether to process the downlink message according to the processing duration 315-*a* (e.g., with a relatively higher threshold throughput) or according to the processing duration 315-*b* (e.g., with a relatively lower threshold throughput).

In some examples, when the UE 115 receives downlink configuration information indicating for the UE 115 to enter the energy efficient scheduling mode and process downlink messages according to the processing duration 315-*b* (e.g., with the relatively lower threshold throughput), the UE 115 may determine whether to use the relatively lower threshold throughput or the relatively higher threshold throughput (e.g., the processing duration 315-*b* or the processing duration 315-*a*, respectively), based on one or more criteria. For example, the UE 115 may perform both downlink and uplink operations by applying the energy efficient scheduling mode (e.g., relaxing a baseband of the UE 115) after an application delay. For example, a container including the indication for the UE 115 to enter the energy efficient scheduling mode (e.g., to use the relatively lower throughput and process the downlink message according to the processing duration 315-*b*) may include an indication of an application delay. The application delay may be a time period that extends until after the downlink slots 305 and the uplink slot 310. Accordingly, the UE 115 may operate according to a configuration currently used by the UE 115 (e.g., the normal scheduling mode associated with the higher threshold throughput and the processing duration 315-*a*) until an expiration of the application delay.

Additionally, or alternatively, the UE 115 may not expect the indication to operate according to the energy efficient scheduling mode (e.g., associated with the relatively lower threshold throughput and the processing duration 315-*b*) if a slot following a downlink transmission scheduled via wideband resources (e.g., the uplink slot 310) includes a dynamic grant. Accordingly, if the UE 115 receives an indication for the UE 115 to operate according to the energy efficient scheduling mode, the UE 115 may wait until the downlink slot 305-*b*, the downlink slot 305-*c*, and the uplink slot 310 are finished (e.g., after expiration of the uplink slot 310 including the dynamic grant) before operating according to the energy efficient scheduling mode (e.g., a low power baseband state).

Additionally, or alternatively, the UE 115 may not expect the indication to operate according to the energy efficient scheduling mode (e.g., associated with the relatively lower threshold throughput and the processing duration 315-*b*) if the UE 115 transmits a scheduling request, a buffer status report (BSR), or a negative acknowledgment (NACK) and is therefore indicating that the UE 115 may transmit via the uplink slot 310. For example, the UE 115 may exit the energy efficient scheduling mode when the UE 115 transmits a scheduling request. The UE 115 may accordingly transmit an uplink message via the uplink slot 310 and may enter or re-enter the energy efficient scheduling mode after the UE 115 transmits the uplink message.

Additionally, or alternatively, the UE 115 may indicate, to the network entity 105, whether the UE 115 is capable of simultaneously transmitting an uplink message and performing downlink processing according to the energy efficient scheduling mode. For example, if the UE 115 is capable of handling uplink and downlink messages (e.g., downlink processing and uplink transmission) using different power states, the UE 115 may enter the energy efficient scheduling mode and may process the downlink message according to the processing duration 315-*b* (e.g., with the relatively lower threshold throughput) while transmitting the uplink message via the uplink slot 310. That is, the UE 115 may not refrain from entering the energy efficient scheduling mode based on the processing duration 315-*b* spilling into the uplink slot 310.

Additionally, or alternatively, the UE 115 may identify (e.g., based on receiving a configuration from the network entity 105) one or more priority or prioritization rules that indicate whether the UE 115 may enter the energy efficient scheduling mode (e.g., continue relaxation of processing a PDSCH message) or transmit an uplink message via the uplink slot 310. For example, the UE 115 may prioritize transmission of the uplink message (e.g., and refrain from entering the energy efficient scheduling mode) if the UE 115 identifies that the UE 115 will transmit one or more logical channels with a relatively higher priority than a priority associated with the indication to enter the energy efficient scheduling mode (e.g., based on PHY or MAC priority). Additionally, or alternatively, the UE 115 may prioritize transmission of the uplink message (e.g., and refrain from entering the energy efficient scheduling mode) if the UE 115 identifies that an uplink experienced delay may exceed a delay threshold. The UE 115 may enter the energy efficient scheduling mode if the UE 115 may not transmit the one or more logical channels with the relatively higher priority or if the uplink experienced delay may not exceed the delay threshold.

Figure 4:
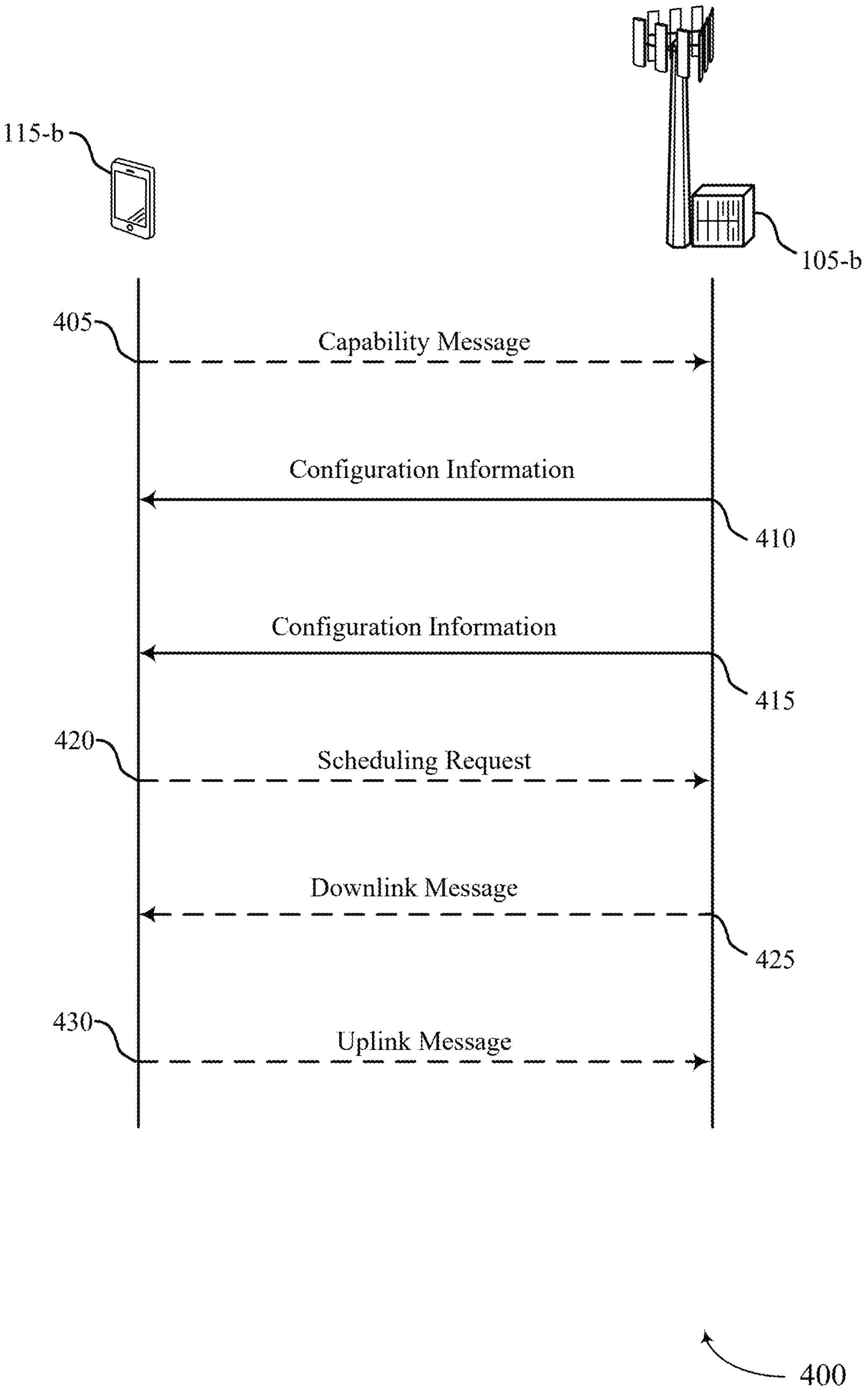
FIG. 4 shows an example of a process flow that supports resolving baseband processing and uplink resource collisions for energy efficient scheduling in accordance with one or more aspects of the present disclosure.

FIG. 4 shows an example of a process flow 400 that supports resolving baseband processing and uplink resource collisions for energy efficient scheduling in accordance with one or more aspects of the present disclosure. The process flow 400 may implement or may be implemented by aspects of the wireless communications system 100, the wireless communications system 200, or the resource diagram 300. For example, the process flow 400 may be implemented by a UE 115 (e.g., a UE 115-*b*) or a network entity 105 (e.g., a network entity 105-*b*), which may be examples of the corresponding devices as described with reference to FIG. 1.

In the following description of the process flow 400, the operations between the UE 115-*b* and the network entity 105-*b* may occur in a different order than the example order shown and, in some examples, may be performed by one or more different devices other than those shown as examples. Some operations also may be omitted from the process flow 400, and other operations may be added to the process flow 400. Further, although some operations or signaling may be shown to occur at different times for discussion purposes, these operations may actually occur at the same time.

In some examples, at 405, the UE 115-*b* may transmit a capability message to the network entity 105-*b*. For example, the UE 115-*b* may indicate whether the UE 115-*b* is capable of transmitting one or more uplink messages to the network entity 105-*b* while performing processing of one or more downlink messages. In some examples, the one or more downlink messages may be received by the UE 115-*b* via one or more wideband resources, and may be processed by the UE 115-*b* using a second threshold throughput that corresponds to a second baseband processing duration.

At 410, the network entity 105-*b* may transmit first configuration information to the UE 115-*b* indicating a first downlink scheduling configuration. In some examples, the first downlink scheduling configuration may be for wideband resources and may be associated with a first threshold throughput that corresponds to a first baseband processing duration.

At 415, the network entity 105-*b* may transmit second configuration information to the UE 115-*b* indicating a second downlink scheduling configuration. In some examples, the second downlink scheduling configuration may be for the wideband resources and may be associated with the second threshold throughput that corresponds to the second baseband processing duration. The second threshold throughput may be relatively less than the first threshold throughput. Accordingly, the second baseband processing duration may be relatively longer than the first baseband processing duration. In some examples, the second configuration information may indicate for the UE 115-*b* to refrain from receiving downlink messages during one or more downlink resources based on processing a first downlink message during the one or more downlink resources according to the second threshold throughput.

In some examples, at 420, the UE 115-*b* may transmit a scheduling request to the network entity 105-*b* requesting one or more uplink resources (e.g., uplink slots) for the UE 115-*b* to transmit one or more uplink messages. For example, the scheduling request may indicate that the UE 115-*b* will transmit the one or more uplink messages via the one or more uplink resources. In some examples, at 425, the UE 115-*b* may receive a downlink message from the network entity 105-*b*.

In some examples, the UE 115-*b* may identify a collision between the one or more uplink resources and the second baseband processing duration. The UE 115-*b* may therefore operate (e.g., receive and process the downlink message) according to one of the first configuration information or the second configuration information based on one or more criteria and based on the collision. For example, the UE 115-*b* may operate according to the first configuration information if the UE 115-*b* transmitted the scheduling request, if the UE 115-*b* identifies one or more uplink messages to be transmitted during the uplink resources that have a higher priority than the second configuration information, or during a time period (e.g., a time period indicated via the second scheduling configuration or a time period including the one or more uplink resources). The UE 115-*b* may operate according to the second configuration information if the UE 115-*b* did not transmit the scheduling request, if the UE 115-*b* does not identify one or more uplink messages to be transmitted during the uplink resources that have a higher priority than the second configuration information, if the UE 115-*b* indicated (e.g., via the configuration information) that the UE 115-*b* may simultaneously perform baseband processing according to the second threshold throughput and transmit one or more uplink messages, or following an expiration of the time period (e.g., after the uplink resources or after an expiration of a timer).

In some examples, at 430, the UE 115-*b* may transmit the one or more uplink messages to the network entity 105-*b*. For example, the UE 115-*b* may transmit the one or more uplink messages via the one or more uplink resources. In some examples, the UE 115-*b* may transmit the one or more uplink messages while performing baseband processing according to the second baseband processing timeline (e.g., in accordance with the capability), or may refrain from operating according to the second configuration information until after the one or more uplink resources (e.g., after expiration of the time period) as described herein.

Figure 5:
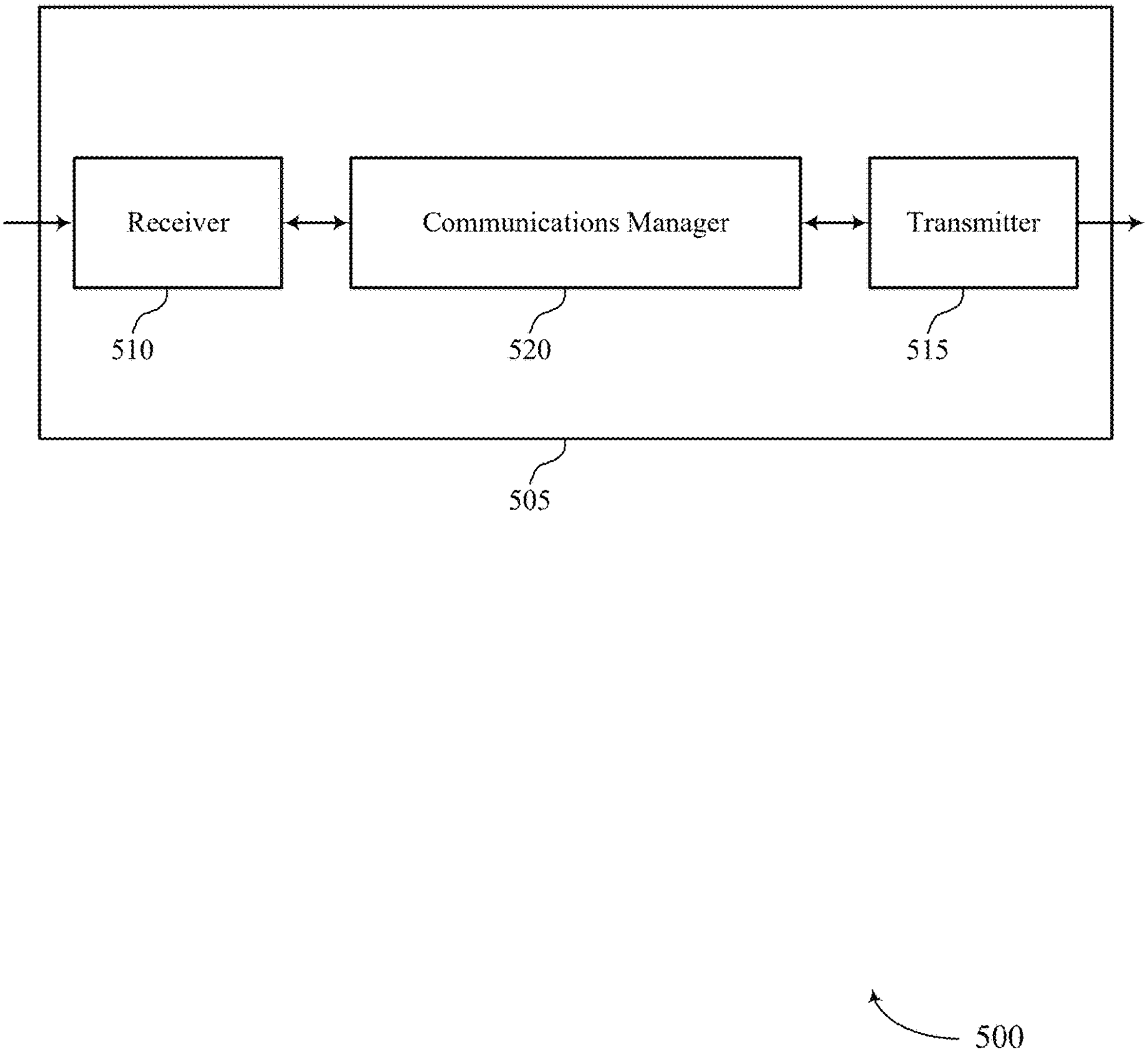
FIGS. 5 and 6 show block diagrams of devices that support resolving baseband processing and uplink resource collisions for energy efficient scheduling in accordance with one or more aspects of the present disclosure.

FIG. 5 shows a block diagram 500 of a device 505 that supports resolving baseband processing and uplink resource collisions for energy efficient scheduling in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to resolving baseband processing and uplink resource collisions for energy efficient scheduling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resolving baseband processing and uplink resource collisions for energy efficient scheduling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of resolving baseband processing and uplink resource collisions for energy efficient scheduling as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving first configuration information for downlink scheduling, the first configuration information associated with a first threshold throughput. The communications manager 520 is capable of, configured to, or operable to support a means for receiving second configuration information for downlink scheduling, the second configuration information associated with a second threshold throughput, where the second threshold throughput is less than the first threshold throughput. The communications manager 520 is capable of, configured to, or operable to support a means for operating according to one of the first configuration information or the second configuration information based on satisfaction of one or more criteria and on a collision between a processing duration associated with the second threshold throughput and one or more uplink time resources.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for resolving collisions between an efficient scheduling baseband processing duration and uplink resources, which may enable reduced power consumption and more efficient utilization of communication resources.

Figure 6:
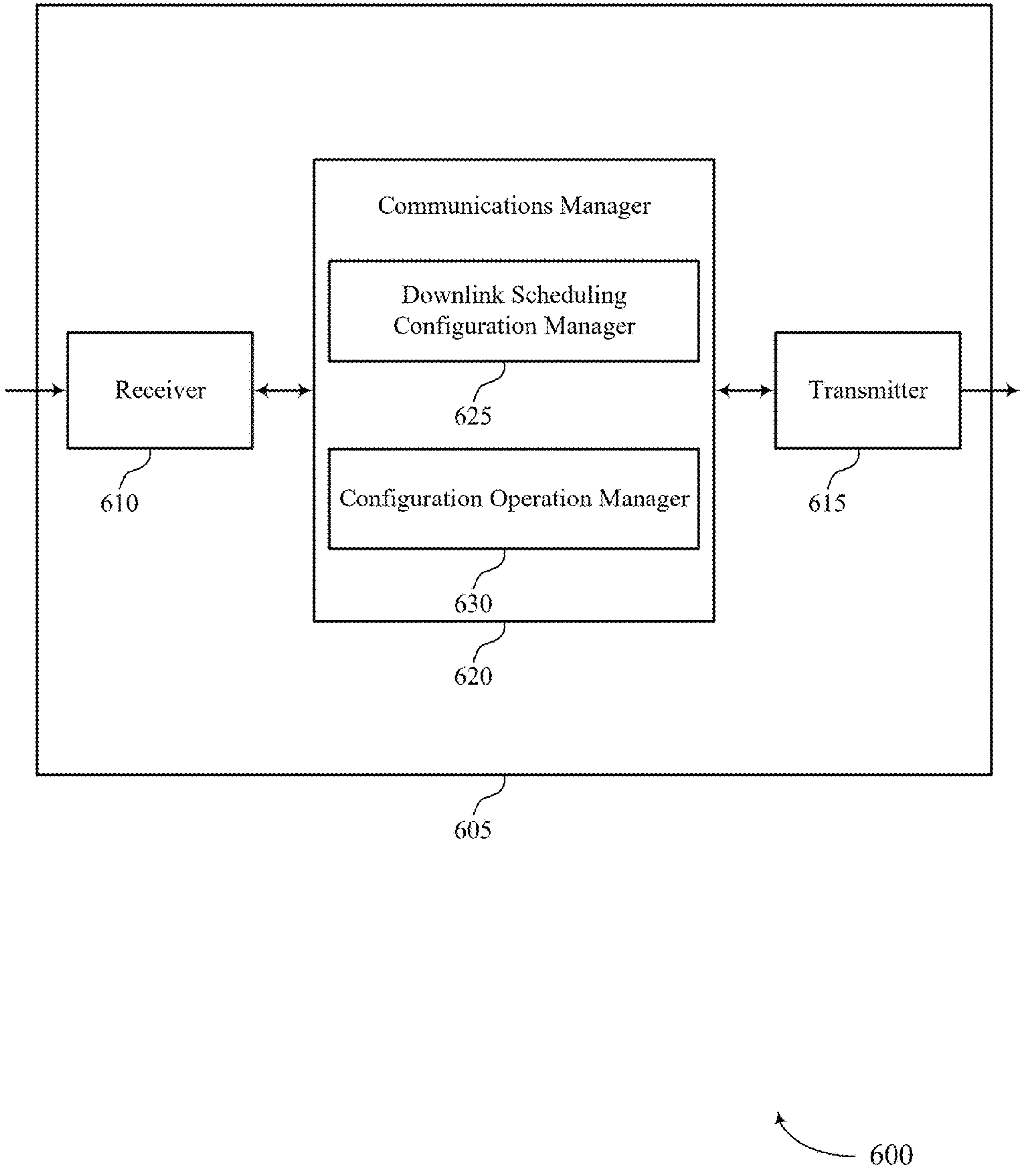

FIG. 6 shows a block diagram 600 of a device 605 that supports resolving baseband processing and uplink resource collisions for energy efficient scheduling in accordance with one or more aspects of the present disclosure. The device 605 may be an example of aspects of a device 505 or a UE 115 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to resolving baseband processing and uplink resource collisions for energy efficient scheduling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resolving baseband processing and uplink resource collisions for energy efficient scheduling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resolving baseband processing and uplink resource collisions for energy efficient scheduling as described herein. For example, the communications manager 620 may include a downlink scheduling configuration manager 625 a configuration operation manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The downlink scheduling configuration manager 625 is capable of, configured to, or operable to support a means for receiving first configuration information for downlink scheduling, the first configuration information associated with a first threshold throughput. The downlink scheduling configuration manager 625 is capable of, configured to, or operable to support a means for receiving second configuration information for downlink scheduling, the second configuration information associated with a second threshold throughput, where the second threshold throughput is less than the first threshold throughput. The configuration operation manager 630 is capable of, configured to, or operable to support a means for operating according to one of the first configuration information or the second configuration information based on satisfaction of one or more criteria and on a collision between a processing duration associated with the second threshold throughput and one or more uplink time resources.

Figure 7:
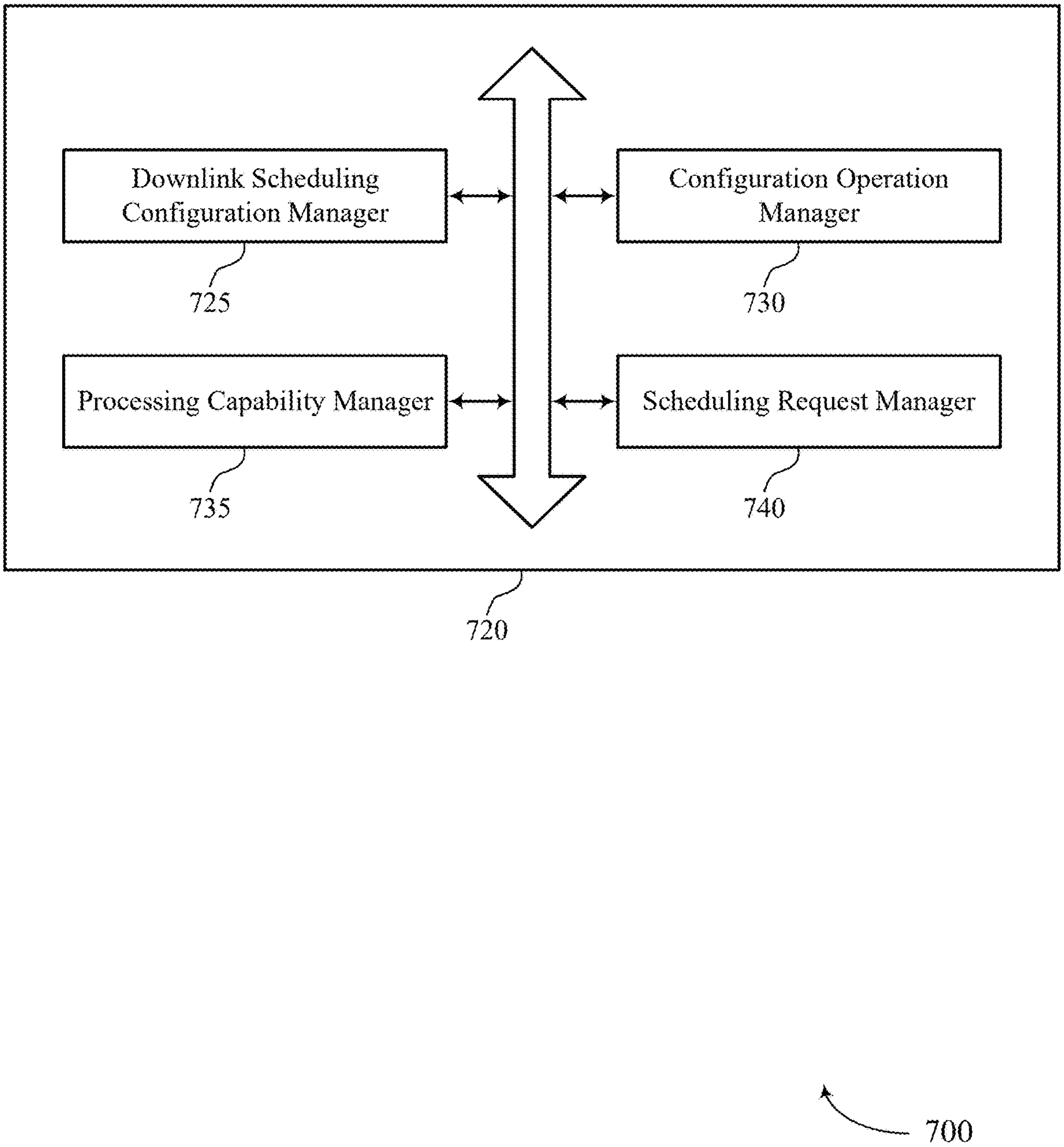
FIG. 7 shows a block diagram of a communications manager that supports resolving baseband processing and uplink resource collisions for energy efficient scheduling in accordance with one or more aspects of the present disclosure.

FIG. 7 shows a block diagram 700 of a communications manager 720 that supports resolving baseband processing and uplink resource collisions for energy efficient scheduling in accordance with one or more aspects of the present disclosure. The communications manager 720 may be an example of aspects of a communications manager 520, a communications manager 620, or both, as described herein. The communications manager 720, or various components thereof, may be an example of means for performing various aspects of resolving baseband processing and uplink resource collisions for energy efficient scheduling as described herein. For example, the communications manager 720 may include a downlink scheduling configuration manager 725, a configuration operation manager 730, a processing capability manager 735, a scheduling request manager 740, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The downlink scheduling configuration manager 725 is capable of, configured to, or operable to support a means for receiving first configuration information for downlink scheduling, the first configuration information associated with a first threshold throughput. In some examples, the downlink scheduling configuration manager 725 is capable of, configured to, or operable to support a means for receiving second configuration information for downlink scheduling, the second configuration information associated with a second threshold throughput, where the second threshold throughput is less than the first threshold throughput. The configuration operation manager 730 is capable of, configured to, or operable to support a means for operating according to one of the first configuration information or the second configuration information based on satisfaction of one or more criteria and on a collision between a processing duration associated with the second threshold throughput and one or more uplink time resources.

In some examples, to support operating according to one of the first configuration information or the second configuration information, the configuration operation manager 730 is capable of, configured to, or operable to support a means for operating according to the first configuration information for a first time period. In some examples, to support operating according to one of the first configuration information or the second configuration information, the configuration operation manager 730 is capable of, configured to, or operable to support a means for operating according to the second configuration information for a second time period, where the second time period occurs after the first time period.

In some examples, to support receiving the second configuration information, the downlink scheduling configuration manager 725 is capable of, configured to, or operable to support a means for receiving an indication of a duration of the first time period, where the one or more criteria include an expiration of the first time period.

In some examples, the second time period begins at a time following the one or more uplink time resources. In some examples, the one or more criteria include an expiration of the one or more uplink time resources.

In some examples, the processing capability manager 735 is capable of, configured to, or operable to support a means for transmitting a capability message indicating a capability of the UE to transmit one or more uplink messages while performing processing of one or more downlink messages according to the second threshold throughput, where operating according to one of the first configuration information or the second configuration information includes operating according to the second configuration information, wherein the one or more criteria comprise the capability. In some examples, the configuration operation manager 730 is capable of, configured to, or operable to support a means for operating according to the second configuration information, where the one or more criteria include the capability.

In some examples, the scheduling request manager 740 is capable of, configured to, or operable to support a means for transmitting a scheduling request message indicating that the UE will transmit via the one or more uplink time resources, where operating according to one of the first configuration information or the second configuration information includes operating according the first configuration information based at least in part on transmitting the scheduling request message, wherein the one or more criteria comprise transmission of the scheduling request message. In some examples, the configuration operation manager 730 is capable of, configured to, or operable to support a means for operating according the first configuration information based on transmitting the scheduling request message, where the one or more criteria include transmission of the scheduling request message.

In some examples, to support operating according to one of the first configuration information or the second configuration information, the configuration operation manager 730 is capable of, configured to, or operable to support a means for operating according to the first configuration information based on a first priority of one or more uplink messages being higher than a second priority associated with operating according to the second configuration information, where the one or more criteria include relative values of the first priority and the second priority.

In some examples, to support operating according to one of the first configuration information or the second configuration information, the configuration operation manager 730 is capable of, configured to, or operable to support a means for operating according to the second configuration information based on a first priority of one or more uplink messages being lower than a second priority associated with operating according to the second configuration information, where the one or more criteria include relative values of the first priority and the second priority.

In some examples, the second configuration information indicates for the UE to refrain from monitoring for one or more downlink messages during the processing duration based on operating according to the second configuration information.

Figure 8:
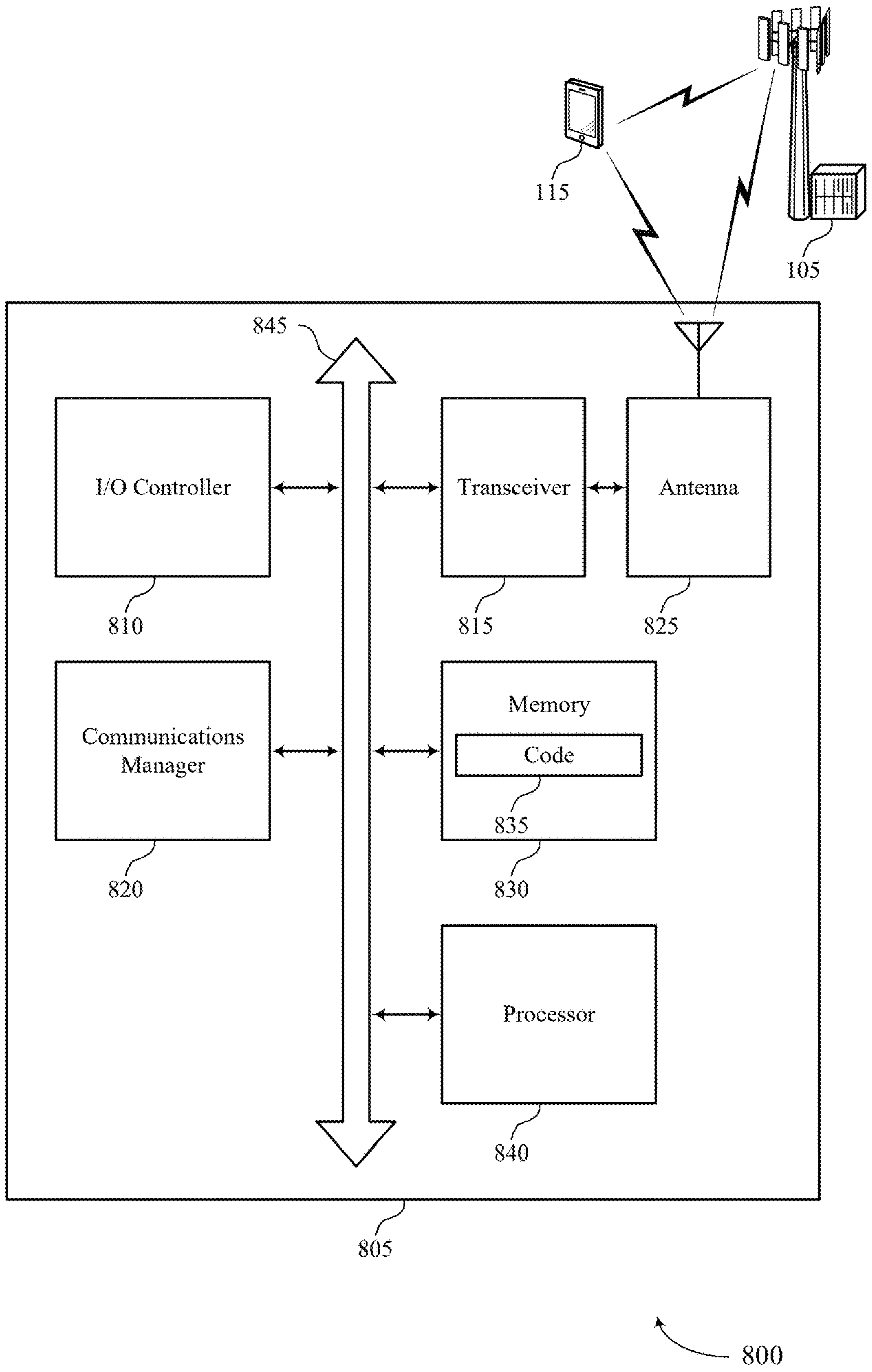
FIG. 8 shows a diagram of a system including a device that supports resolving baseband processing and uplink resource collisions for energy efficient scheduling in accordance with one or more aspects of the present disclosure.

FIG. 8 shows a diagram of a system 800 including a device 805 that supports resolving baseband processing and uplink resource collisions for energy efficient scheduling in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting resolving baseband processing and uplink resource collisions for energy efficient scheduling). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving first configuration information for downlink scheduling, the first configuration information associated with a first threshold throughput. The communications manager 820 is capable of, configured to, or operable to support a means for receiving second configuration information for downlink scheduling, the second configuration information associated with a second threshold throughput, where the second threshold throughput is less than the first threshold throughput. The communications manager 820 is capable of, configured to, or operable to support a means for operating according to one of the first configuration information or the second configuration information based on satisfaction of one or more criteria and on a collision between a processing duration associated with the second threshold throughput and one or more uplink time resources.

By including or configuring the communications manager 820 in accordance with examples as described herein, the device 805 may support techniques for resolving collisions between an efficient scheduling baseband processing duration and uplink resources, which may enable improved communication reliability, reduced power consumption, more efficient utilization of communication resources, improved coordination between devices, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of resolving baseband processing and uplink resource collisions for energy efficient scheduling as described herein, or the at least one processor 840 and the at least one memory 830 may be otherwise configured to, individually or collectively, perform or support such operations.

Figure 9:
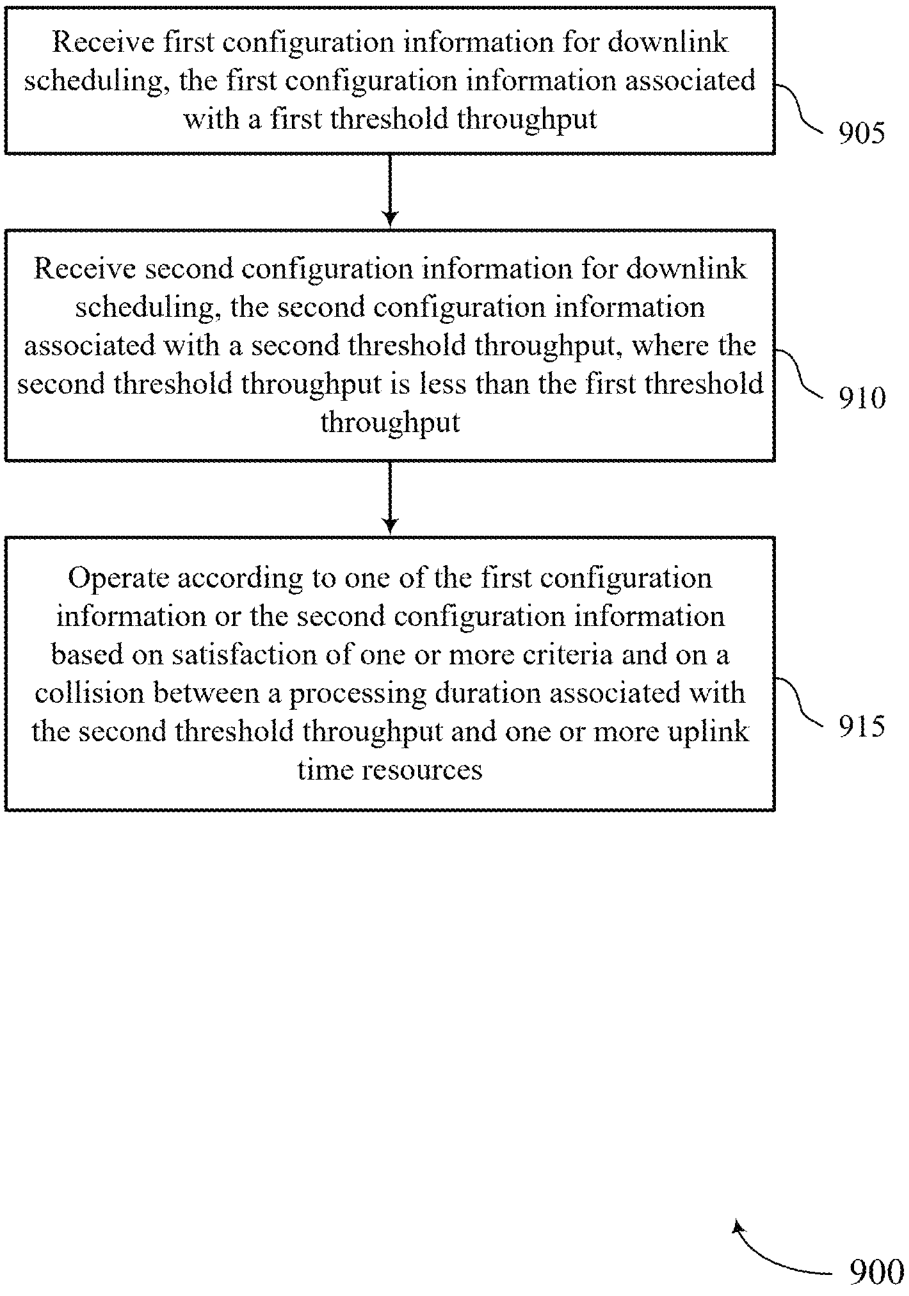
FIGS. 9 and 10 show flowcharts illustrating methods that support resolving baseband processing and uplink resource collisions for energy efficient scheduling in accordance with one or more aspects of the present disclosure.

FIG. 9 shows a flowchart illustrating a method 900 that supports resolving baseband processing and uplink resource collisions for energy efficient scheduling in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving first configuration information for downlink scheduling, the first configuration information associated with a first threshold throughput. The operations of 905 may be performed in accordance with examples as disclosed herein. In some examples, aspects of the operations of 905 may be performed by a downlink scheduling configuration manager 725 as described with reference to FIG. 7.

At 910, the method may include receiving second configuration information for downlink scheduling, the second configuration information associated with a second threshold throughput, where the second threshold throughput is less than the first threshold throughput. The operations of 910 may be performed in accordance with examples as disclosed herein. In some examples, aspects of the operations of 910 may be performed by a downlink scheduling configuration manager 725 as described with reference to FIG. 7.

At 915, the method may include operating according to one of the first configuration information or the second configuration information based on satisfaction of one or more criteria and on a collision between a processing duration associated with the second threshold throughput and one or more uplink time resources. The operations of 915 may be performed in accordance with examples as disclosed herein. In some examples, aspects of the operations of 915 may be performed by a configuration operation manager 730 as described with reference to FIG. 7.

Figure 10:
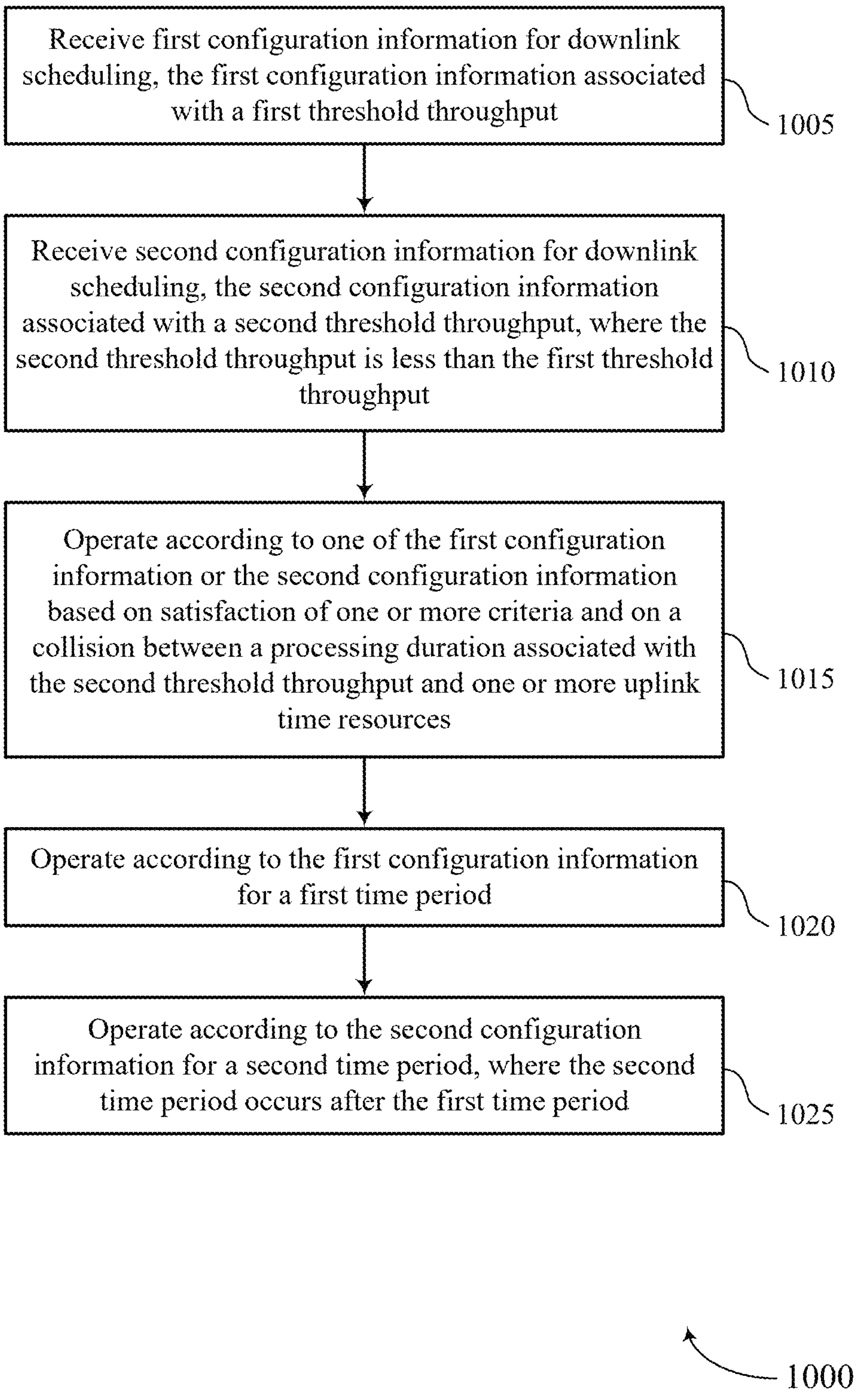

FIG. 10 shows a flowchart illustrating a method 1000 that supports resolving baseband processing and uplink resource collisions for energy efficient scheduling in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving first configuration information for downlink scheduling, the first configuration information associated with a first threshold throughput. The operations of 1005 may be performed in accordance with examples as disclosed herein. In some examples, aspects of the operations of 1005 may be performed by a downlink scheduling configuration manager 725 as described with reference to FIG. 7.

At 1010, the method may include receiving second configuration information for downlink scheduling, the second configuration information associated with a second threshold throughput, where the second threshold throughput is less than the first threshold throughput. The operations of 1010 may be performed in accordance with examples as disclosed herein. In some examples, aspects of the operations of 1010 may be performed by a downlink scheduling configuration manager 725 as described with reference to FIG. 7.

At 1015, the method may include operating according to one of the first configuration information or the second configuration information based on satisfaction of one or more criteria and on a collision between a processing duration associated with the second threshold throughput and one or more uplink time resources. The operations of 1015 may be performed in accordance with examples as disclosed herein. In some examples, aspects of the operations of 1015 may be performed by a configuration operation manager 730 as described with reference to FIG. 7.

At 1020, the method may include operating according to the first configuration information for a first time period. The operations of 1020 may be performed in accordance with examples as disclosed herein. In some examples, aspects of the operations of 1020 may be performed by a configuration operation manager 730 as described with reference to FIG. 7.

At 1025, the method may include operating according to the second configuration information for a second time period, where the second time period occurs after the first time period. The operations of 1025 may be performed in accordance with examples as disclosed herein. In some examples, aspects of the operations of 1025 may be performed by a configuration operation manager 730 as described with reference to FIG. 7.

The following provides an overview of aspects of the present disclosure:

Aspect 1: A method for wireless communications by a UE, comprising: receiving first configuration information for downlink scheduling, the first configuration information associated with a first threshold throughput; receiving second configuration information for downlink scheduling, the second configuration information associated with a second threshold throughput, wherein the second threshold throughput is less than the first threshold throughput; and operating according to one of the first configuration information or the second configuration information based at least in part on satisfaction of one or more criteria and on a collision between a processing duration associated with the second threshold throughput and one or more uplink time resources.

Aspect 2: The method of aspect 1, wherein operating according to one of the first configuration information or the second configuration information comprises: operating according to the first configuration information for a first time period; and operating according to the second configuration information for a second time period, wherein the second time period occurs after the first time period.

Aspect 3: The method of aspect 2, wherein receiving the second configuration information comprises: receiving an indication of a duration of the first time period, wherein the one or more criteria comprise an expiration of the first time period.

Aspect 4: The method of any of aspects 2 through 3, wherein the second time period begins at a time following the one or more uplink time resources, and the one or more criteria comprise an expiration of the one or more uplink time resources.

Aspect 5: The method of any of aspects 1 through 4, further comprising: transmitting a capability message indicating a capability of the UE to transmit one or more uplink messages while performing processing of one or more downlink messages according to the second threshold throughput, wherein operating according to one of the first configuration information or the second configuration information comprises: operating according to the second configuration information, wherein the one or more criteria comprise the capability.

Aspect 6: The method of any of aspects 1 through 5, further comprising: transmitting a scheduling request message indicating that the UE will transmit via the one or more uplink time resources, wherein operating according to one of the first configuration information or the second configuration information comprises: operating according the first configuration information based at least in part on transmitting the scheduling request message, wherein the one or more criteria comprise transmission of the scheduling request message.

Aspect 7: The method of any of aspects 1 through 6, wherein operating according to one of the first configuration information or the second configuration information comprises: operating according to the first configuration information based at least in part on a first priority of one or more uplink messages being higher than a second priority associated with operating according to the second configuration information, wherein the one or more criteria comprise relative values of the first priority and the second priority.

Aspect 8: The method of any of aspects 1 through 7, wherein operating according to one of the first configuration information or the second configuration information comprises: operating according to the second configuration information based at least in part on a first priority of one or more uplink messages being lower than a second priority associated with operating according to the second configuration information, wherein the one or more criteria comprise relative values of the first priority and the second priority.

Aspect 9: The method of any of aspects 1 through 7, wherein the second configuration information indicates for the UE to refrain from monitoring for one or more downlink messages during the processing duration based at least in part on operating according to the second configuration information.

Aspect 10: A UE for wireless communications, comprising one or more memories storing processor-executable code, and one or more processors coupled with the one or more memories and individually or collectively operable to execute the code to cause the UE to perform a method of any of aspects 1 through 9.

Aspect 11: A UE for wireless communications, comprising at least one means for performing a method of any of aspects 1 through 9.

Aspect 12: A non-transitory computer-readable medium storing code for wireless communications, the code comprising instructions executable by one or more processors to perform a method of any of aspects 1 through 9.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive first configuration information for downlink scheduling, the first configuration information associated with a first threshold throughput;

receive second configuration information for downlink scheduling, the second configuration information associated with a second threshold throughput, wherein the second threshold throughput is less than the first threshold throughput; and operate according to one of the first configuration information or the second configuration information based at least in part on satisfaction of one or more criteria and on a collision between a processing duration associated with the second threshold throughput and one or more uplink time resources.

2. The UE of claim 1, wherein, to operate according to one of the first configuration information or the second configuration information, the one or more processors are individually or collectively operable to execute the code to cause the UE to:

operate according to the first configuration information for a first time period; and operate according to the second configuration information for a second time period, wherein the second time period occurs after the first time period.

3. The UE of claim 2, wherein, to receive the second configuration information, the one or more processors are individually or collectively operable to execute the code to cause the UE to:

receive an indication of a duration of the first time period, wherein the one or more criteria comprise an expiration of the first time period.

4. The UE of claim 2, wherein the second time period begins at a time following the one or more uplink time resources, and wherein the one or more criteria comprise an expiration of the one or more uplink time resources.

5. The UE of claim 1, wherein the one or more processors are individually or collectively further operable to execute the code to cause the UE to:

transmit a capability message indicating a capability of the UE to transmit one or more uplink messages while performing processing of one or more downlink messages according to the second threshold throughput, wherein, to operate according to one of the first configuration information or the second configuration information, the one or more processors are individually or collectively further operable to execute the code to cause the UE to:

operate according to the second configuration information, wherein the one or more criteria comprise the capability.

6. The UE of claim 1, wherein the one or more processors are individually or collectively further operable to execute the code to cause the UE to:

transmit a scheduling request message indicating that the UE will transmit via the one or more uplink time resources, wherein, to operate according to one of the first configuration information or the second configuration information, the one or more processors are individually or collectively further operable to execute the code to cause the UE to:

operate according the first configuration information based at least in part on transmitting the scheduling request message, wherein the one or more criteria comprise transmission of the scheduling request message.

7. The UE of claim 1, wherein, to operate according to one of the first configuration information or the second configuration information, the one or more processors are individually or collectively operable to execute the code to cause the UE to:

operate according to the first configuration information based at least in part on a first priority of one or more uplink messages being higher than a second priority associated with operating according to the second configuration information, wherein the one or more criteria comprise relative values of the first priority and the second priority.

8. The UE of claim 1, wherein, to operate according to one of the first configuration information or the second configuration information, the one or more processors are individually or collectively operable to execute the code to cause the UE to:

operate according to the second configuration information based at least in part on a first priority of one or more uplink messages being lower than a second priority associated with operating according to the second configuration information, wherein the one or more criteria comprise relative values of the first priority and the second priority.

9. The UE of claim 1, wherein the second configuration information indicates for the UE to refrain from monitoring for one or more downlink messages during the processing duration based at least in part on operating according to the second configuration information.

10. A method for wireless communications by a user equipment (UE), comprising:

receiving first configuration information for downlink scheduling, the first configuration information associated with a first threshold throughput;

receiving second configuration information for downlink scheduling, the second configuration information associated with a second threshold throughput, wherein the second threshold throughput is less than the first threshold throughput; and operating according to one of the first configuration information or the second configuration information based at least in part on satisfaction of one or more criteria and on a collision between a processing duration associated with the second threshold throughput and one or more uplink time resources.

11. The method of claim 10, wherein operating according to one of the first configuration information or the second configuration information comprises:

operating according to the first configuration information for a first time period; and operating according to the second configuration information for a second time period, wherein the second time period occurs after the first time period.

12. The method of claim 11, wherein receiving the second configuration information comprises:

receiving an indication of a duration of the first time period, wherein the one or more criteria comprise an expiration of the first time period.

13. The method of claim 11, wherein the second time period begins at a time following the one or more uplink time resources, and wherein the one or more criteria comprise an expiration of the one or more uplink time resources.

14. The method of claim 10, further comprising:

transmitting a capability message indicating a capability of the UE to transmit one or more uplink messages while performing processing of one or more downlink messages according to the second threshold throughput, wherein operating according to one of the first configuration information or the second configuration information comprises:

operating according to the second configuration information, wherein the one or more criteria comprise the capability.

15. The method of claim 10, further comprising:

transmitting a scheduling request message indicating that the UE will transmit via the one or more uplink time resources, wherein operating according to one of the first configuration information or the second configuration information comprises:

operating according the first configuration information based at least in part on transmitting the scheduling request message, wherein the one or more criteria comprise transmission of the scheduling request message.

16. The method of claim 10, wherein operating according to one of the first configuration information or the second configuration information comprises:

operating according to the first configuration information based at least in part on a first priority of one or more uplink messages being higher than a second priority associated with operating according to the second configuration information, wherein the one or more criteria comprise relative values of the first priority and the second priority.

17. The method of claim 10, wherein operating according to one of the first configuration information or the second configuration information comprises:

operating according to the second configuration information based at least in part on a first priority of one or more uplink messages being lower than a second priority associated with operating according to the second configuration information, wherein the one or more criteria comprise relative values of the first priority and the second priority.

18. The method of claim 10, wherein the second configuration information indicates for the UE to refrain from monitoring for one or more downlink messages during the processing duration based at least in part on operating according to the second configuration information.

19. A non-transitory computer-readable medium storing code for wireless communications, the code comprising instructions executable by one or more processors to:

receive first configuration information for downlink scheduling, the first configuration information associated with a first threshold throughput;

receive second configuration information for downlink scheduling, the second configuration information associated with a second threshold throughput, wherein the second threshold throughput is less than the first threshold throughput; and operate according to one of the first configuration information or the second configuration information based at least in part on satisfaction of one or more criteria and on a collision between a processing duration associated with the second threshold throughput and one or more uplink time resources.

20. The non-transitory computer-readable medium of claim 19, wherein the instructions to operate according to one of the first configuration information or the second configuration information are executable by the one or more processors to:

operate according to the first configuration information for a first time period; and operate according to the second configuration information for a second time period, wherein the second time period occurs after the first time period.

* * * * *